United States Patent Office 2,719,816
Patented Oct. 4, 1955

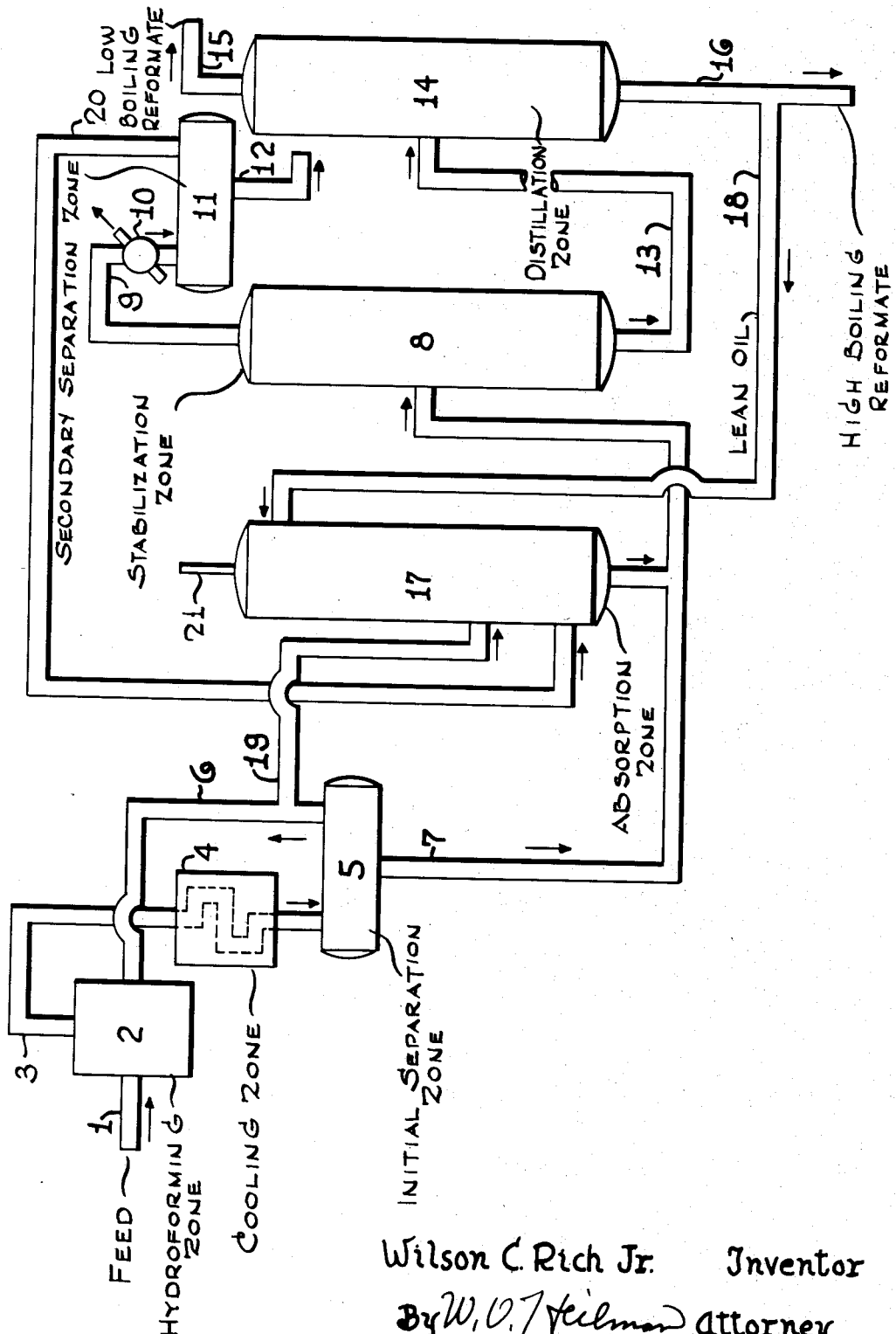

2,719,816

LIGHT ENDS RECOVERY IN FLUID HYDROFORMING

Wilson C. Rich, Jr., Mountainside, N. J., assignor to Esso Research and Engineering Company, a corporation of Delaware Application July 29, 1952, Serial No. 301,563

3 Claims. (Cl. 196—8)

The present invention is concerned with an improved hydroforming operation. The invention is more particularly concerned with a process of segregating and recovering hydrocarbon constituents boiling in the motor fuel boiling range secured from a hydroforming operation. In accordance with the present invention, the product gases from the hydroformer containing relatively large volumes of hydrogen are processed in an integrated separation zone, absorption zone and stabilization zone wherein considerably less quantities of lean oil circulation are required in order to secure equivalent recovery of desired hydrocarbon constituents boiling in the motor fuel boiling range.

It is well known in the art to treat various hydrocarbon fractions under conditions that hydrogen is formed. For instance, it is known to treat petroleum fractions boiling below about 430° F. at temperatures in the range from about 800° F. to 1000° F., and at pressures in the range from about 10 to 300 lbs. per inch in the presence of a catalyst such as molybdenum oxide on alumina under conditions to dehydrogenate the molecule and to secure a resultant product of improved octane number. It is also known in the art to carry out various oil absorption operations wherein desired hydrocarbon constituents are absorbed in the oil and later recovered from the oil. Undesirable hydrocarbon constituents pass overhead from the absorption zone. The processing of the gases, such as those secured from a hydroforming operation which contains relatively large volumes of hydrogen in order to segregate the desired hydrocarbon constituents heretofore have presented several problems. In order to secure efficient absorption and separation of the desired hydrocarbon constituents from the gases, relatively large volumes of absorption oil have been required. In accordance with the present process, the quantity of the required oil in the absorption zone is materially lessened by introducing uncondensed gases from a separation zone into an intermediate point of the oil absorption zone and introducing stabilizer gases from a stabilization zone which are substantially free of hydrogen into the bottom of the absorption zone.

The process of the present invention may be more fully understood by reference to the drawing illustrating one embodiment of the same. Referring specifically to the drawing, a hydrocarbon feed fraction, as for example, one boiling in the range from about 100° F. to 430° F. is introduced into hydroforming zone 2 by means of line 1. Temperatures in zone 2 are in the range from about 850° F. to 950° F. while the pressure is about 200 lbs. per sq. in. gauge. The catalyst may comprise any suitable hydroforming catalyst, as for example 10% molybdenum oxide on alumina carrier. The product gases from the hydroforming zone comprising relatively large volumes of hydrogen are removed by means of line 3, passed through a cooling zone 4 and introduced into separation zone 5. A typical analysis of a hydroforming product including recycle gas is as follows:

| | Mol Percent |
|---|---|
| Hydrogen | 57 |
| Methane | 12 |
| Ethane and C$_2$ unsaturates | 8 |
| Propane and C$_3$ unsaturates | 5 |
| Butanes and C$_4$ unsaturates | 3 |
| Pentanes and C$_5$ unsaturates and hydrocarbons containing more than five carbon atoms per molecule | 15 |
| | 100 |

Uncondensed gases, a portion of which are recycled to zone 2 are removed overhead from separation zone 5 by means of line 6. A typical analysis of these uncondensed gases is for example:

| | Mol Percent |
|---|---|
| Hydrogen | 67 |
| Methane | 15 |
| Ethane and C$_2$ unsaturates | 8 |
| Propane and C$_3$ unsaturates | 5 |
| Butanes and C$_4$ unsaturates | 3 |
| Pentanes and C$_5$ unsaturates and hydrocarbons containing more than five carbon atoms per molecule | 2 |
| | 100 |

The liquid condensate product, a typical analysis of which is as follows:

| | L. V. Percent |
|---|---|
| Hydrogen | Trace |
| Methane | 0.3 |
| Ethane and C$_2$ unsaturates | 1.4 |
| Propane and C$_3$ unsaturates | 3.2 |
| Butanes and C$_4$ unsaturates | 6.0 |
| Pentanes and C$_5$ unsaturates and hydrocarbons containing more than five carbon atoms per molecule | 89.1 |
| | 100.0 | is withdrawn from the bottom of zone 5 by means of line 7 and introduced into a stabilization zone 8. Temperature and pressure conditions in zone 8 are adapted to remove overhead hydrocarbon constituents boiling below hydrocarbons containing five carbon atoms in the molecule. This stream is removed overhead by means of line 9, cooled in cooling zone 10 and passed into separation zone 11. A typical analysis of the stream removed by means of line 9 is as follows:

| | Mol Percent |
|---|---|
| Hydrogen | 2.5 |
| Methane | 20 |
| Ethane and C$_2$ unsaturates | 36.5 |
| Propane and C$_3$ unsaturates | 22 |
| Butanes and C$_4$ unsaturates | 19 |
| | 100 |

The temperature in the bottom of stabilization zone 8 is in the range from about 500° F. to 600° F., while the top temperature is in the range from about 150° F. to 200° F. A liquid product stream is withdrawn from secondary separation zone 11 by means of line 12. A typical analysis of this stream is as follows:

| | L. V. Percent |
|---|---|
| Hydrogen | 0.7 |
| Methane | 15.1 |
| Ethane and C$_2$ unsaturates | 35.6 |
| Propane and C$_3$ unsaturates | 26.6 |
| Butanes and C$_4$ unsaturates | 22.0 |
| | 100 |

A bottoms stream is removed from stabilization zone 8 by means of line 13. A typical analysis is as follows:

| | L. V. Percent |
|---|---|
| Hydroformed Hydrocarbons boiling in motor fuel range | 51 |
| Absorption oil | 49 |
| | 100 |

This stream is introduced into a distillation zone 14 wherein a separation is made between the hydroformed hydrocarbon (hydroformate) and lean oil. Distillation zone 14 is operated at substantially atmospheric pressure. The bottoms temperature is in the range from about 375° to 500° F., preferably in the range from about 400° F. to 450° F., while the top temperature is in the range from about 300° F. to 375° F. A liquid stabilized low boiling hydroformate product is removed overhead from the distillation zone through line 15, condensed and further refined as desired.

A heavy hydroformate boiling in the range from about 325° F. to 430° F. is removed by means of line 16. At least a portion of this stream is recycled to the top of an absorption zone 17 by means of line 18, while the remainder is withdrawn from the system and further refined and handled as desired.

An uncondensed stream is withdrawn from the top of separation zone 11 by means of line 20. A typical analysis of this stream is as follows:

| | Mol Percent |
|---|---|
| Hydrogen | 13.6 |
| Methane | 10.6 |
| Ethane and C₂ unsaturates | 35.0 |
| Propane and C₃ unsaturates | 27 |
| Butanes and C₄ unsaturates | 13.8 |
| | 100 |

In accordance with the present invention, the net portion of the hydrogen-rich gas made in the hydroforming reaction withdrawn from the top of separation zone 5 is introduced into an intermediate point of absorption zone 17 by means of line 19. Also, in accordance with the present invention, the vaporous stream withdrawn from the top of zone 11 by means of line 20 is passed into the bottom of absorption zone 17.

The process of the present invention generally covers an improved method of handling hydrogen-rich gas secured from a hydroforming operation. In hydroforming operations, the large quantities of hydrogen produced tend to carry appreciable quantities of valuable materials such as butanes and heavier components into the vapor stream. However, in accordance with the present invention, the stabilizer gas is processed in the lower area of an absorber.

In the upper section of the absorption tower, the high concentration of hydrogen has the effect of lowering the effective absorption pressure. Thus, when the lean oil plus absorption naphtha leaves the upper section and enters the lower section where a low partial pressure of hydrogen exists, the liquid still has appreciable absorption capacity and, because of the high ratio of liquid to gas in the lower section, can effect essentially complete absorption of the C₃ and C₄ portions contained in the gas feed to this lower section from the stabilizer through line 20. Thus, the recoverable portions of the gas from the stabilizer are not sent to the main section of the absorber and do not require additional lean oil for their recovery.

The process of the present invention may be more fully understood by the following example illustrating the same.

*Example*

In an operation wherein the analysis of the gases from the initial separation zone, the secondary separation zone, and the gas from the absorption zone were as follows:

| | Initial Separation Zone Line 19 | Secondary Separation Zone Line 20 | From Absorption Zone Line 21 |
|---|---|---|---|
| | *Mols* | *Mols* | *Mols* |
| Water | 6 | | 6 |
| Hydrogen | 668 | 8.4 | 672 |
| Methane | 144 | 6.5 | 146 |
| Ethane and C₂ unsaturates | 84 | 21.5 | 79 |
| Propane and C₃ unsaturates | 52 | 16.7 | 40 |
| Butanes and C₄ unsaturates | 28 | 8.3 | 10.5 |
| Pentanes and C₅ unsaturates and hydrocarbons containing more than five carbon atoms per molecule | 18 | 0.1 | |
| Total | 1,000 | 61.5 | 953.5 | and wherein in one operation the gas from lines 19 and 20 were combined and introduced into said absorption zone, and wherein in a second operation the gas from the secondary separation zone was passed into the lower area of said absorption zone and the gas from the said initial zone was passed into an intermediate point of said absorption zone. The amount of lean oil required for 71% of butane recovery was as follows:

*Lean oil requirements for 71% C₄ recovery*

| Operation I | 245 B/1000 mols gas |
|---|---|
| Operation II | 200 B/1000 mols gas |

Thus, it is apparent that when segregating hydrocarbons boiling in the motor fuel boiling range from gases containing appreciable quantities of hydrogen the process of the present invention produces unexpected desirable results in that the amount of oil circulated is materially reduced.

What is claimed is:

1. Improved process for the segregation of hydrocarbons boiling in the motor fuel boiling range from a vaporous mixture containing said hydrocarbons, lower boiling hydrocarbons and a predominantly large mol percent of hydrogen which comprises segregating a vaporous stream comprising said lower boiling hydrocarbons, some of said hydrocarbons boiling in the motor fuel boiling range and the hydrogen from a condensed hydrocarbon stream substantially completely free of hydrogen in an initial separation zone, passing said condensed stream to a stabilization zone wherein a separation is made between hydrocarbons boiling in the motor fuel boiling range and lower boiling hydrocarbons, passing said hydrocarbons boiling in the motor fuel boiling range to a distillation zone wherein a separation is made between low boiling hydrocarbons and high boiling hydrocarbons, passing at least a portion of said high boiling hydrocarbons from said distillation zone into the top of an absorption zone as an absorption oil, removing overhead from said stabilization zone lower boiling hydrocarbons, cooling the same and passing the cooled stream to a secondary separation zone, segregating uncondensed hydrocarbons and passing the same to a lower point of said absorption zone, passing said vaporous stream from said initial separation zone into an intermediate point of said absorption zone, countercurrently contacting the upflowing vaporous stream with said downflowing absorption oil, whereby said hydrocarbons boiling in the motor fuel boiling range are absorbed in said absorption oil, removing hydrogen and hydrocarbons boiling below the motor fuel boiling range overhead from said absorption zone and removing said absorption oil comprising said higher boiling hydrocarbons and absorbed hydrocarbons from the bottom of said absorption zone and passing the same to said stabilization zone.

2. Process as defined by claim 1, wherein said vaporous hydrocarbon mixture is secured from a hydroforming process.

3. Improved integrated operation comprising a hydroforming step and a light end recovery step which comprises hydroforming a petroleum fraction boiling in the motor fuel boiling range at a temperature in the range from about 850° F. to 950° F., and at a pressure of about 200 lbs. in the presence of a dehydrogenation catalyst, removing the hydroformed product and cooling the same, passing the cooled product into an initial separation zone, segregating a gaseous product in said initial separation zone, which gaseous product is characterized by containing a predominantly large mol percent of hydrogen, introducing said gaseous product at an intermediate point into an absorption zone, removing from initial separation zone a condensate, introducing said condensate into a stabilization zone, maintaining conditions in said stabilization zone to remove overhead as a vapor hydrocarbon constituents containing 4 and less carbon atoms in the molecule, cooling said vapors and introducing the cooled vapors into a secondary separation zone, removing vapors from said secondary separation zone and introducing said latter vapors into said absorption zone at a point below the point of introduction of said vapors from said initial separation zone, withdrawing as bottoms from said stabilization zone a hydroformed product boiling in the range extending from the boiling range of hydrocarbons having 5 carbon atoms in the molecule up to 430° F., introducing said latter product into a distillation zone, maintaining conditions in said distillation zone to remove overhead a reformate boiling in the range between about 100° F. and 325° F., removing as a bottoms product from said distillation zone a heavy reformate boiling in the range from about 325° F. to 430° F., introducing at least a portion of said heavy reformate into the top of said absorption zone, countercurrently contacting said vapors from said initial separation zone and said vapors from said secondary separation zone with said heavy reformate in said absorption zone, maintaining conditions in said absorption zone to absorb in said heavy reformate hydrocarbons containing 4 and more carbon atoms in the molecule, withdrawing from said absorption zone said heavy reformate containing said absorbed hydrocarbons and passing the same to said stabilization zone along with said condensate from said initial separation zone.

References Cited in the file of this patent

UNITED STATES PATENTS

| | | |
|---|---|---|
| 2,181,302 | Keith | Nov. 29, 1939 |
| 2,184,096 | Gerhold | Dec. 19, 1939 |
| 2,327,187 | Hill | Aug. 17, 1943 |
| 2,388,732 | Finsterbusch | Nov. 13, 1945 |
| 2,404,902 | Claussen et al. | July 30, 1946 |
| 2,468,750 | Gudenrath | May 3, 1949 |
| 2,580,478 | Stine | Jan. 1, 1952 |

OTHER REFERENCES

Sachanen: Conversion of Petroleum, page 153 (1940); Reinhold Publishing Corp., 330 West 42nd Street, N. Y.